Patented June 13, 1933

1,914,178

UNITED STATES PATENT OFFICE

GORDON R. STEUART, DECEASED, LATE OF DENVER, COLORADO, BY KATHERINE STEUART, ADMINISTRATRIX, OF DENVER, COLORADO, ASSIGNOR, BY MESNE ASSIGNMENTS, TO KALUNITE COMPANY, A CORPORATION OF DELAWARE

BASIC ALUMINUM SULPHATE COMPOUND

No Drawing. Application filed April 23, 1932. Serial No. 607,221.

This invention relates to a new composition of matter consisting of a basic aluminum sulphate compound which, in its composition, physical structure, and reactive qualities is advantageously distinguishable from basic aluminum sulphate compounds heretofore known.

The new composition of matter consists of a substantially anhydrous basic aluminum sulphate having approximately the composition, $3Al_2O_3.4SO_3$. and further characterized in that it is completely reactive with sulphuric acid to form a water soluble aluminum sulphate and also reactive with water to form a water soluble basic aluminum sulphate and a more highly basic insoluble aluminum sulphate. The composition of the soluble sulphate is, substantially, $Al_2O_3.2SO_3$. and the composition of the insoluble sulphate is, substantially, $Al_2O_3.SO_3$. the soluble sulphate being produced in the proportion of one part to one and four tenths parts of the insoluble sulphate.

There has been produced a new, substantially anhydrous basic aluminum sulphate by a process which forms the subject matter of a co-pending application, filed April 23, 1932, Serial No. 607,218 which, briefly stated, consists in preparing from a normal ammonium alum solution, a basic ammonium alum by heating the alum solution under pressure to temperature between 140° and 200° C., which treatment results in the decomposition of the normal alum, with the formation and precipitation in a state of fine division of the basic ammonium alum, from which has been eliminated 55% of the sulphur trioxide constituent of the normal alum decomposed and 67% of the ammonium sulphate component of the decomposed alum. These values, together with any undecomposed alum and any additional ammonium sulphate which may have been admixed with the normal solution, will be found in the mother liquor and may be salvaged in the preparation of additional quantities of normal alum solution. The basic alum, after separation from its mother liquor, is then calcined at temperatures of from 350° to 600° C., the heating being progressive, preferably, in a multiple muffle hearth furnace, so as to drive off as much excess ammonia as possible and, at the higher temperatures in the neighborhood of 600° C., the heating must be relatively prolonged so as to substantially eliminate all the ammonium sulphate. The decomposition of the ammonium sulphate constituent of the basic alum occurs, for the most part, at the lower temperatures and the sulphur trioxide constituent of the ammonium sulphate reacts with the uncombined alumina of he basic aluminum sulphate, forming a less basic aluminum sulphate. This liberated and recombined sulphur trioxide is, however, eliminated in the later stages of the calcination of the basic alum, together with any undecomposed ammonium sulphate, so that the final composition of the residual aluminum sulphate has practically the composition of the aluminum sulphate present in the basic alum. The basicity of the product may indeed be slightly greater than that of the aluminum sulphate constituent of the basic alum, owing to the fact that at prolonged high temperature a certain amount of the combined sulphur trioxide may be driven off as sulphur dioxide. The composition of the substantially anhydrous basic aluminum sulphate produced by this process is substantially represented by the following formula:

$$3Al_2O_3.4SO_3.$$

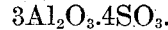

The ammonia vaporized, together with any ammonium sulphate which may be vaporized without decomposition, can be readily recovered for use, as, for instance, in the preparation of new quantities of normal alum.

The advantage of the new, substantially anhydrous basic aluminum sulphate is that it can, by the described process, be manufactured cheaply, but, apart from this, it is believed, in its composition and in its reactive qualities with sulphuric acid and with water, clearly distinguished from basic aluminum sulphate compounds as heretofore manfactured or from any basic aluminum sulphate compounds which would result from the practice of any methods heretofore suggested for the manufacture of basic aluminum sulphate. It might be pointed out that the new anhydrous basic aluminum sulphate in its reaction with sulphuric acid is so highly sensitive that it is only necessary to start the reaction in some part of the mixture, after which the reaction will go on to completion without the application of external heat.

In its reaction with water, the new anhydrous basic aluminum sulphate in admixture with water should be heated to about ninety or more degrees.

Having now described the invention, what is claimed as new and desired to secure by Letters Patent, is:

As a new article of manufacture an anhydrous basic aluminum sulphate having approximately the composition, $3Al_2O_3.4SO_3$. and further characterized in that it is completely reactive with sulphuric acid to form soluble aluminum sulphate and reactive with water to form a solution of a basic aluminum sulphate of the formula, $Al_2O_3.2SO_3$. and an insoluble basic aluminum sulphate of the formula, $Al_2O_3.SO_3$.

KATHERINE STEUART,
*Administratrix of the Estate of Gordon R. Steuart, Deceased.*